Dec. 29, 1964  D. E. WILLIAMSON  3,163,700
RADIATION METER UTILIZING A DUAL SURFACED DETECTING CELL
Filed July 26, 1960  2 Sheets-Sheet 1

INVENTOR.
Donald E. Williamson
BY
Roberts, Cushman & Grover
ATT'YS.

Dec. 29, 1964  D. E. WILLIAMSON  3,163,700
RADIATION METER UTILIZING A DUAL SURFACED DETECTING CELL
Filed July 26, 1960  2 Sheets-Sheet 2

INVENTOR.
Donald E. Williamson
BY
Roberts, Cushman & Grover
ATT'YS

3,163,700
RADIATION METER UTILIZING A DUAL SURFACED DETECTING CELL

Donald E. Williamson, Lexington, Mass. (% Williamson Development Co., Inc., 317 Main St., West Concord, Mass.)
Filed July 26, 1960, Ser. No. 45,437
3 Claims. (Cl. 88—22.5)

The field of the present invention is that of radition detectors and meters, more particularly of the type, usually referred to as pyrometers, suitable for measuring the temperature of radiating surfaces by means of devices adapted to respond to radiant energy emitted by such surfaces.

The device according to the present invention, similar to previously proposed devices, relies on the comparison of two emitters by means of a single detector similar to the well-known flicker photometers wherein light from two different sources alterately illuminates a translucent screen. While this principle has been used, generally speaking, for purposes of pyrometers, previously suggested systems are rather complicated and inconvenient, or require the conversion of current values into temperature values by means of calibration curves, or are not strictly null systems therefore requiring changes in calibration of the instrument upon changes in sensitivity of the detecting element.

Objects of the present invention are to provide an improved radiation detector or pyrometer of the above indicated type which is particularly reliable because independent of fluctuations in the sensitivity of the detecting element; to provide such a pyrometer which is a true null system; to provide such a system wherein adjustment of a secondary energy source can be directly calibrated in terms of temperature to be measured and wherein secondary source can be optically adjusted exactly to match the energy emitted by the body to be measured; to provide such a system wherein the instrument scale can be calibrated directly in temperature terms without the need of calibration curves; to provide such a system which requires a minimum of optical and electrical components all of which are comparatively simple, rugged and non-equivocal with regard to many characteristics, due to the inherent qualities of a true null system; and generally speaking to provide such a system which is comparatively inexpensive but nevertheless provides for measurements within a wide range and of the highest accuracy and reliability.

The substance of the invention can be briefly summarized in some of its aspects as follows.

In a principal aspect, radiation detecting and measuring devices according to the invention incorporate a quantitatively responsive radiation detecting element which element has preferably two radiation receiving regions effecting nearly equal cell sensitivity, such as opposite sides of a flat cell. Combined with this detector are optical light concentrating instrumentalities for directing the radiation to be measured from the primary source towards one of the receiving regions of the detecting element; an adjustable auxiliary or secondary radiation source; means for directing radiation from the axualiary source onto the other receiving region of the detecting element; means for modulating such as for example shopping, both primary and auxiliary radiation beams in strict synchronism but in opposite phase; means for detecting the difference, if any, between the primary and auxiliary radiation energies impinging on the detecting element respectively; and means for adjusting the auxiliary energy source for obtaining a null reading of the energy detecting means.

The means for directing the emission to be measured towards the detector can be a reflective or refractive optical system, and these preferably include as a last stage, immediately in front of the detecting element, radiation concentrating optics such as a so-called cone channel as described in the applicant's patent No. 2,788,708.

The means for periodically modulating both energy beams consist in a preferred embodiment of a chopping wheel which serves both beams such that an obstructing portion such as a tooth, of the chopper cuts off one of the beams or energy paths while the other beam passes through a gap between obstructing portions. In the preferred embodiment described an aperture element is inserted between the chopper and the cone channel for purposes which will appear hereinbelow.

The auxiliary radiation is preferably directed towards the detecting element by means of a light conductor such as lucite rod, and this auxiliary beam can be advantageously associated with means, such as an optical wedge, for adjusting the auxiliary energy.

Devices of the above type are based on the well-known principles of black body radiation which generally speaking require that both the emitter to be measured and the detecting element of the instrument should obey the Stefan-Boltzmann law over the total range of wave length to be measured. However it is not necessary that both are black body emitters of unit emissivity, provided that proper precaution is taken in the calibration of the instrument intended for a particular purpose, with particular emissive properties of the surface to be measured. The advantage of using strictly black body emitters is merely that they utilize the entire emitted energy, but it is entirely feasible and often advantageous to use only portions of the entire electromagnetic spectrum, with correspondingly corrective calibration of the measuring system. Thus, various types of detecting elements can be utilized for purposes of the invention provided they are quantitatively responsive to radiant energy, such as photoemissive cells, thermocouples, bolometers and photoresistive detectors. For purposes of the embodiment hereindescribed, photoconductive cells of the lead sulphide type are quite satisfactory. Such cells can be provided with two opposite, parallel faces constituting the above mentioned distinct radiation receiving regions, one for the primary and one for the auxaliary beam, the cell being practically of equal sensitivity to radiation impinging on either, or both receiving regions.

These and other aspects of the invention will appear from the following detailed description of a practical embodiment illustrating its novel characteristics.

The description refers to drawings in which FIG. 1 is an isometric schematical diagram of a complete system according to the invention;

Figure 1:
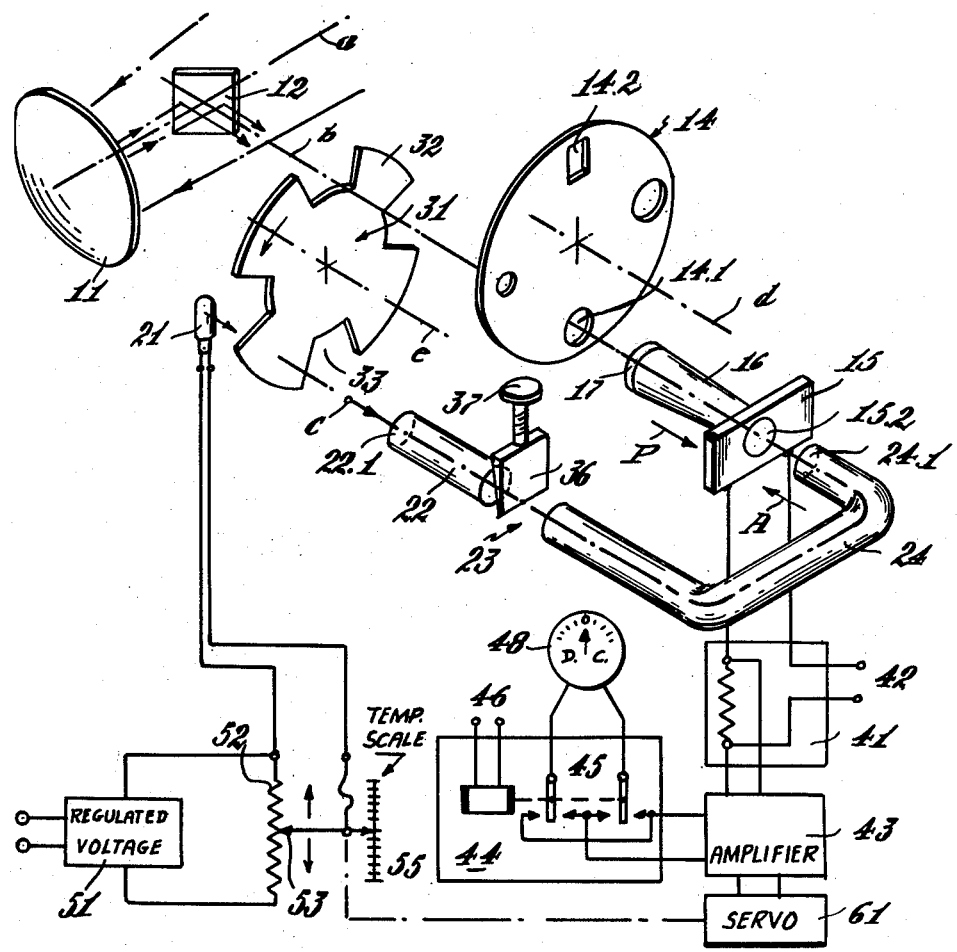

As shown in FIG. 1, the means for directing the primary radiation consist in the embodiment to be described of a first surface spherical mirror 11 located in the radiation impinging on axis $a$ from the object to be measured this mirror constituting an image forming reflector. The reflector 11 forms a converging beam which can be focused on the radiation sensitive element to be described hereinbelow. This focused beam is deflected from the axis $a$ of the original beam into the instrument axis $b$ by means of a first surface plane mirror 12 placed at a 45° angle to the axes $a$, $b$. Where the wave lengths involved permit the use of optical material appropriate for that purpose, a refracting lens system can be used in place of the above described reflecting system. In the following description the term "front" will be used to designate the direction from which radiation is approaching on axis $b$ from the surface to be measured.

In the deflected beam is placed an aperture plate, in this embodiment a disk 14 with several aperture windows 14.1, 14.2. By rotating the disk 14 about its axis $d$, any one of the windows can be aligned with the axis $b$ and the principal beam.

An image of the surface to be measured is formed by the mirrors 11 and 12 on the selected aperture stop in plate 14, for example 14.1. Focusing for different object distances is accomplished by moving mirror 11 axially. The optical characteristics of mirror 11 and the size and shape of the selected aperture of plate 14 define the size and shape of the field of view. If a large surface is to be measured, the aperture in plate 14 will preferably be of the maximum size permitted by the receiving region of the detecting means. If the surface to be measured has a restricted area or shape, such as a segment of a heated wire, the aperture can be modified to match the shape at hand. It will be understood that since the sensitive cell responds to the total energy received, the maximum size aperture will lead to the greatest sensitivity, or ability to measure the lowest temperatures.

In the described embodiment, the radiation detecting means is a lead sulphide cell 15 with a front receiving region 15.1 and a rear receiving region 15.2. The cell is preceded by the last stage of the beam defining system, in this instance a cone-channel 16 which includes a lens 17 of suitable infrared transmitting material.

The construction of the detector element including channel and infrared lens is conventional.

A source of the auxiliary radiation is provided by a small lamp 21 in an axis $c$ displaced from, in the embodiment described parallel to, the main instrument axis $b$ which emits a beam towards a light pipe such as a lucite rod 22 which, beyond a gap 23, continues as a bent rod 24 whose end 24.1 faces the receiving region 15.2 of the cell 15. Thus, the light conductor 22, 24 has a first, receiving end 22.1 and a second, emitting end 24.1, between parallel sections on axes $b$ and $c$, and a transverse section therebetween. The relation between cone-channel 16, cell 15, and light pipe 24 is clearly shown in FIG. 2.

In order to compensate for differences in manufacturing tolerances of the various components including lamp 21, a light attenuator such as an optical wedge 36 with trimmer screw 37 is provided in the gap 23, which serves as a calibration means by adjustably valving the light which is transmitted to the back of cell 15 through light pipe 24.

An alternating signal output from the cell 15 is obtained by means of uniformly modulating both primary and auxiliary radiation in synchronism but opposite phase, in this embodiment by way of chopping the radiations on axes $b$ and $c$ with a common chopping disk 31 which is placed in front of the aperture plate 14 and driven on the axis $e$ by a suitable motor (not shown) and having obstructive portions such as teeth 32 and transmissive portions such as gaps 33. The teeth and gaps are placed in such relation to axes $b$ and $c$ that the radiation along one of the axes is transmitted, such as that on axis $b$ in FIG. 1, while the radiation along the other axes is obstructed, such as that on axis $c$ in FIG. 1. In other words when the incoming radiation on axis $b$ strikes the detector cell 15 through one of the gaps 33, some tooth 32 of the chopper obstructs the light from the auxiliary lamp 21, and conversely when the incoming radiation to be measured is cut off from the cell, light from the lamp 21 is permitted to pass through the chopper and to enter the light conduit system 22, 24.

In order to derive from the detecting means information as to which source is stronger, a phase sensing instrumentality must be provided as indicated at 41. Such circuitry is well-known in the art and requires little detailed description beyond its intended function. In the present case, the chopper speed and the number of teeth are so arranged that the signal is chopped at 60 cycles which can be easily accomplished by using a synchronous motor for driving the disk 31, using the power line frequency as a reference. The circuit 41 discriminates between and individually detects the interlaced, alternate half wave series of radiation impulses derived with 180° phase relation by the cell 15 from the source to be measured and from the auxiliary lamp 21 respectively, by relating them to a reference wave that is synchronous with the chopping frequency.

Figure 3:
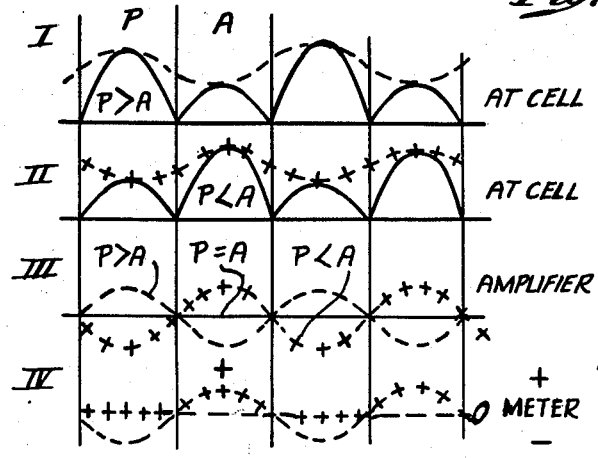
FIG. 3 is a diagram explaining the operation, in the practical embodiment of a zero reading meter and of a servo system, both distinguishing the sense of difference between primary and secondary radiation.

FIG. 1 indicates at 41 the cell circuit with direct current supply terminals 42 and feeding into a conventional amplifier 43 which incorporates means to smoothen the output signal of the cell. FIG. 3 indicates that output signal at I in full lines, for the case $P>A$ that is primary radiation greater than auxiliary radiation, the legends P and A being accordingly applied to the cell 15 in FIG. 1. At II, FIG. 3 similarly indicates the situation $P<A$. In both instances, the shape of the envelope is indicated in dotted lines and it will be observed that the two envelopes are in phase opposition. Needless to say, when $P=A$, the output will not contain a wave component.

The amplifier 43 feeds into the phase sensing circuit 44 which includes a conventional double pole double throw switch 45 of the vibrator type, driven by a magnet 46 energized from the 60 cycle line that also supplies the motor for driving the chopper disk 31. FIG. 3 also indicates, at III, the amplified cell output for $P>A$ and $P<A$, and at IV the output of the phase sensing device 44. It will be observed that the output voltage will be above or below, respectively, of the reference voltage. Equal intensity $P=A$ results in a zero output of 44 which is indicated as zero reading of the indicator 48. This null balance system compensates for the ambient temperature which, as is well-known, very strongly effects the sensitivity of photosensitive cells. By using the null balance system above described, the absolute sensitivity of the cell will not affect the calibration of the instrument. It will be understood that any circuitry for accomplishing the desired result can be used instead of the one described arrangement which was found to be fully satisfactory for many practical purposes.

The null indicator 48 is conveniently a D.-C. milliammeter having a zero centered scale, as indicated. If the incoming radiation P impinging on the front 15.1 of the cell 15 is stronger than that on 15.2, the meter will be deflected in one direction and if it is weaker the meter will be deflected in the opposite direction.

The null indicator 48 can be brought to zero reading by means of a regulated D.-C. power supply indicated at 51 and including a control potentiometer 52 with a contact 53 related to a scale, for example the circular scale of a knob, schematically indicated at 55. The knob which controls the potentiometer 55 and hence the brightness of the lamp 21 can thus be calibrated to represent the temperature of the surface which is being measured. Due to the 180° phase relationship of the radiation coming from the cell from the two directions, it will be seen that as above described the brightness of lamp 21 can be adjusted to match the front energy entering from the object being measured providing in that case a null reading with the corresponding potentiometer reading giving the temperature of the body to be measured.

FIG. 1 also indicates as an alternative the arrangement of a servo system 61, in some conventional electrical or mechanical manner coupled to the potentiometer 55 so that an automatic null balance can be obtained if desirable. It will now be evident that for purposes of servo operation the above described discrimination between the senses of difference between P and A is required in order to run the servo system in the proper senses.

Figure 2:
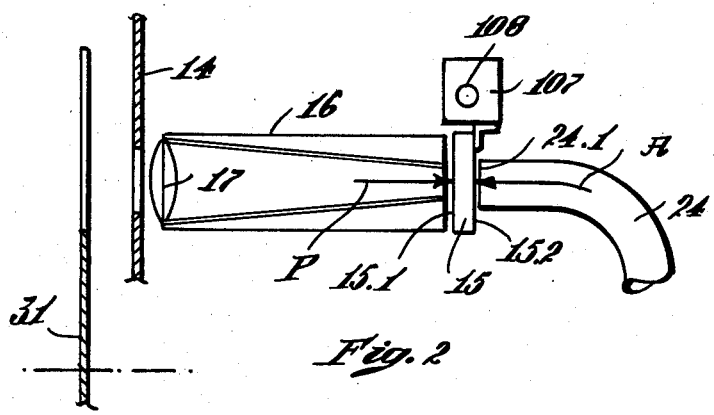
FIG. 2 is a schematical cross section through the detector portion of the system according to FIG. 1.
Figure 4:
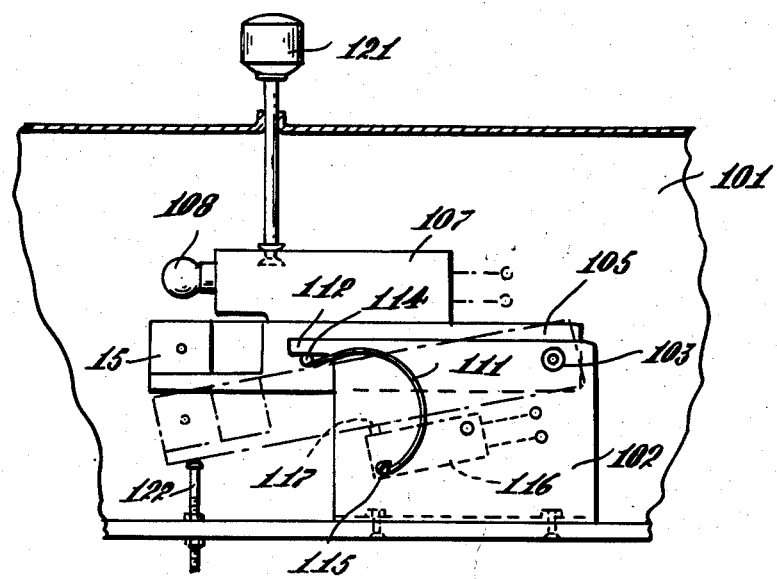
FIG. 4 is an elevation, with the housing removed, of a provision for focusing beams of radiant energy on the detecting element.

In the practical embodiment herein described it was found to be very convenient to make provisions for initially aligning and focusing the incoming beam on the aperture plate 14, and this arrangement will now be described with reference to FIGS. 2 and 4.

In these figures, 101 is part of the housing of the device upon which is mounted a cell support stand 102 carrying on a pivot 103 an arm 105 on which the cell 15 as well as a lamp box 107 are mounted. A spring 111 on two pins 114, 115 (114 on 105 and 115 on 102) tends to swing the arm 105 upwardly, in which position it is normally arrested by the nose 112 of stand 102 engaging the spring pin 114. A conventional microswitch 116 is mounted on the stand 102 and so arranged that its actuating pin 117 is depressed and the switch closed in lowered position of the arm 105. A knob 121, fastended to the lamp box 107 or arm 105 extends from the apparatus housing 101 and permits downward swinging of the arm 105 until it is stopped by stud 122. It will be evident that, so long as knob 121 is depressed, the lamp 108 will take the place of cell 15, the microswitch 116 at the same time connecting the supply circuit of the lamp. Upon releasing the knob the cell returns into normal operative position and the lamp 108 is automatically turned off. By replacing the cell with the lamp, the field of view defining aperture selected on disk 14 can be projected back through the optical system, illuminating the precise area which is measured when the cell is in place. The lamp 108 also permits the focusing of the primary source on the aperture.

It should be noted that the optical characteristics of the cone channel condenser 16, as set forth in my above referred to Patent No. 2,788,708, include sharp imagery over a relatively small area, favorable f/number, and an energy distribution at the exit plane of the cone channel, opposite face 15.1, which is quite uniform over that plane and renders the device independent of variations in point-to-point sensitivity of the detecting element whatever its nature. These features are especially beneficial within a device according to the invention since they permit the use of the smallest area of effective detector element area, whereby the available original radiation can be most efficiently utilized.

The operation of the above described device should be evident from the preceding description but will be shortly recapitulated as follows.

The beam defining system 11 is directed towards the source to be measured and the latter aligned on cell 15 by means of the above described auxiliary system including lamp 108. The measuring circuit including lamp 21 having been connected to the power supply, the appropriate aperture selected on disk 14, the chopper disk motor put into operation, and the attenuating device 36 adjusted for purposes of calibration, the apparatus is ready for operation. For manual operation the potentiometer 52 is adjusted until the instrument 48 exhibits zero reading, when the scale 55 indicates the temperature. For automatic operation by means of the servo system 61, manual setting is unnecessary and the temperature can be continuously read on scale 55.

It will now be evident that the present system employs an optical comparison or null balance and is therefore independent of variations in the sensitivity of the cell and the electrical components.

It should be understood that the present disclosure is for the purpose of illustration only and that this invention includes all modifications and equivalents which fall within the scope of the appended claims.

I claim:

1. A radiation measuring device of the type wherein beams of radiations from a primary source to be measured and from an adjustable auxiliary source, respectively, are photoelectrically detected to furnish intensity proportionate electric signals which are in conventional circuitry sensed for comparison by metering means, comprising:
   a unitary radiation detecting cell having two opposite faces at the front and rear thereof responding with a signal output essentially in the same manner to radiation impinging on either of said faces;
   an optical system for defining a beam of radiation from said primary source to said cell, said system including radiation concentrating means which are opaque to radiation from without the beam and extend closely to said front face of the cell;
   an auxiliary radiation source outside said radiation concentrating means;
   means for directing a beam of radiation from said auxiliary source towards said rear face of the cell in a path avoiding said radiation concentrating means;
   optical modulating means common to both beams for alternatingly obstructing said source radiation and said auxiliary radiation, causing said cell alternately to detect energy values of said radiations, respectively, and to furnish signals proportionate thereto; and
   means for controlling the radiation of said auxiliary source for said comparison of signals.

2. Device according to claim 1 wherein said radiation concentrating means is a light condensing cone channel with its discharge aperture at said front face and having a substantially opaque tubular wall which admits light only through the entrance aperture of the channel.

3. Device according to claim 1 wherein said source and auxiliary radiations are directed in paths having parallel sections both intersected by said optical modulating means.

References Cited in the file of this patent

UNITED STATES PATENTS

| | | |
|---|---|---|
| 1,970,103 | Runaldue | Aug. 14, 1934 |
| 2,096,323 | Gille | Oct. 19, 1937 |
| 2,282,045 | Fleischer | May 5, 1942 |
| 2,305,576 | Lamb | Dec. 15, 1942 |
| 2,788,708 | Williamson | Apr. 16, 1957 |
| 2,927,502 | Watrous | Mar. 8, 1960 |
| 2,951,162 | Stein | Aug. 30, 1960 |

OTHER REFERENCES

Instruments, Radiation Pyrometer, vol. 26, April 1953, issue 4, page 520.